(12) United States Patent
Mai et al.

(10) Patent No.: US 12,019,512 B2
(45) Date of Patent: Jun. 25, 2024

(54) SYSTEM AND METHOD TO CONTROL MEMORY ERROR DETECTION WITH AUTOMATIC DISABLING

(71) Applicant: Micron Technology, Inc., Boise, ID (US)

(72) Inventors: Thanh K. Mai, Allen, TX (US); Parthasarathy Gajapathy, McKinney, TX (US); David R. Brown, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 126 days.

(21) Appl. No.: 17/829,576

(22) Filed: Jun. 1, 2022

(65) Prior Publication Data
US 2023/0393929 A1  Dec. 7, 2023

(51) Int. Cl.
*G06F 11/10* (2006.01)
(52) U.S. Cl.
CPC ................ *G06F 11/1004* (2013.01)
(58) Field of Classification Search
None
See application file for complete search history.

(56) References Cited

U.S. PATENT DOCUMENTS

| | | | | |
|---|---|---|---|---|
| 4,493,081 A * | 1/1985 | Schmidt | ............. | G11C 11/00 714/57 |
| 5,838,990 A * | 11/1998 | Park | ............. | G11C 11/4076 710/14 |
| 11,157,354 B2 * | 10/2021 | Son | ............. | G11C 11/4087 |
| 2008/0163007 A1 * | 7/2008 | Shaeffer | ............. | G06F 11/1004 714/E11.04 |
| 2008/0181348 A1 * | 7/2008 | Best | ............. | H03L 7/07 375/376 |
| 2016/0139983 A1 * | 5/2016 | Chang | ............. | G11C 29/52 714/49 |
| 2018/0082725 A1 * | 3/2018 | Stott | ............. | G06F 13/1689 |

(Continued)

OTHER PUBLICATIONS

Sung-Ho Wang et al., "A 500-Mb/s quadruple data rate SDRAM interface using a skew cancellation technique," in IEEE Journal of Solid-State Circuits, vol. 36, No. 4, pp. 648-657, Apr. 2001, doi: 10.1109/4.913743. (Year: 2001).*

(Continued)

*Primary Examiner* — Daniel F. McMahon
(74) *Attorney, Agent, or Firm* — Fletcher Yoder, P.C.

(57) ABSTRACT

A memory device includes a command interface that when operating receives a write command, an input output interface that when in operation receives data signals in conjunction with the write command, and error detection circuitry coupled to the input output interface. The error detection circuitry is configured to generate a first signal indicative of a first period of time during which a first determination is made regarding a first portion of the data signals utilizing a first data strobe signal as a first clock signal, generate a second signal indicative of a second period of time during which a second determination is made regarding a second portion of the data signals utilizing a second data strobe signal as a second clock signal, and generate a control signal based upon the first signal, the second signal, and a slower of the first data strobe signal and the second data strobe signal.

20 Claims, 5 Drawing Sheets

(56) References Cited

U.S. PATENT DOCUMENTS

2019/0172512 A1* 6/2019 Oh ..................... G11C 29/1201
2019/0235760 A1* 8/2019 Howe .................. G06F 3/0673
2020/0143854 A1* 5/2020 Kim ..................... G11C 7/1078

OTHER PUBLICATIONS

A. Lingambudi et al., "Timing correlation between clock & data strobe with dynamic rank switching in DDR3 RDIMMs," 2014 Annual IEEE India Conference (INDICON), Pune, India, 2014, pp. 1-5, (Year: 2014).*

* cited by examiner

SYSTEM AND METHOD TO CONTROL MEMORY ERROR DETECTION WITH AUTOMATIC DISABLING

BACKGROUND

Field of the Present Disclosure

Embodiments of the present disclosure relate generally to the field of semiconductor devices. More specifically, embodiments of the present disclosure relate to control of error detection circuitry in memory devices.

Description of Related Art

Semiconductor devices (e.g., memory devices) have increasingly been designed to include error detection and/or error correction circuitry. For example, some memory device include error detection circuitry utilized in conjunction with incoming data to the memory device (i.e., data received as part of a data write operation). However, as different variations of memory devices are produced within a particular type of memory, there may be issues in utilizing the error detection circuitry across the variations of memory devices within a particular type of memory.

Embodiments of the present disclosure may be directed to one or more of the problems set forth above.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To ensure proper operation, memory devices can include error detection circuitry operates correctly in conjunction with a data write operation to detect errors in data being written to the memory device. Additionally, memory devices may include the ability to automatically disable this error detection operation. While some types of memories employ the same data strobe (DQS) signals for certain variants of a given type of memory, other variants of that type of memory can operate with separate timing domains for DQS signals when applied to upper and lower portions of data of the memory device. In these situations, the differences in the timing domain of the DQS signals can cause issues with the operation of the error detection circuitry and/or its disabling. Accordingly, embodiments described herein include control circuitry that can be operated to synchronize control signals for the error detection circuitry. Through synchronization of the control signals for the error detection circuitry of memory devices, proper functioning of the error detection circuitry and/or its disabling can be achieved.

Figure 1:
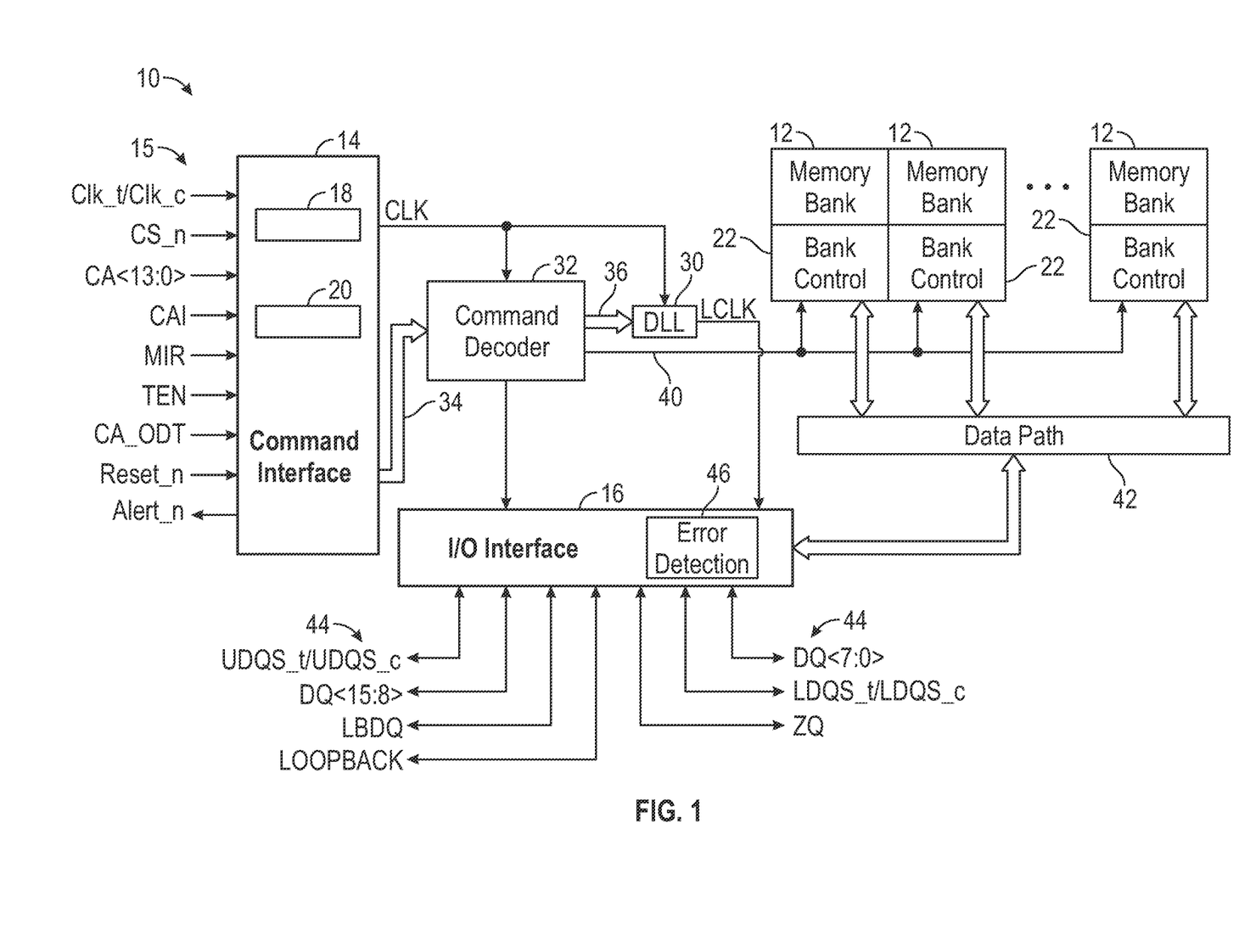
FIG. 1 is a simplified block diagram illustrating certain features of a memory device, according to an embodiment of the present disclosure.

Turning now to the figures, FIG. 1 is a simplified block diagram illustrating certain features of a memory device 10. Specifically, the block diagram of FIG. 1 is a functional block diagram illustrating certain functionality of the memory device 10. In accordance with one embodiment, the memory device 10 may be a double data rate type five synchronous dynamic random access memory (DDR5 SDRAM) device. Various features of DDR5 SDRAM allow for reduced power consumption, more bandwidth and more storage capacity compared to prior generations of DDR SDRAM.

The memory device 10 may include a number of memory banks 12. The memory banks 12 may be DDR5 SDRAM memory banks, for instance. The memory banks 12 may be provided on one or more chips (e.g., SDRAM chips) that are arranged on dual inline memory modules (DIMMS). Each DIMM may include a number of SDRAM memory chips (e.g., X4, X8, or X16 memory chips), as will be appreciated. Each SDRAM memory chip may include one or more memory banks 12. The memory device 10 represents a portion of a single memory chip (e.g., SDRAM chip) having a number of memory banks 12. For DDR5, the memory banks 12 may be further arranged to form bank groups. For instance, for an 8 gigabit (Gb) DDR5 SDRAM, the memory chip may include 16 memory banks 12, arranged into 8 bank groups, each bank group including 2 memory banks. For a 16 Gb DDR5 SDRAM, the memory chip may include 32 memory banks 12, arranged into 8 bank groups, each bank group including 4 memory banks, for instance.

Various other configurations, organization and sizes of the memory banks 12 on the memory device 10 may be utilized depending on the application and design of the overall system. Likewise, different variations of memory devices 10 within the same type of memory (e.g., DDR5 SDRAM) are envisioned. For example, types of memory device 10 may include a X4 DDR5 SDRAM, X8 DDR5 SDRAM, and X16 DDR5 SDRAM whereby the X4, X8, and X16 designations correspond to variations in the width of their respective data busses (i.e., allowing for 4 bit read/writes, 8 bit read/writes, and 16 bit read/writes).

The memory device 10 may include a command interface 14 and an input/output (I/O or IO) interface 16. The command interface 14 is configured to provide a number of signals (e.g., signals 15) from an external device (not shown), such as a processor or controller. The processor or controller may provide various signals 15 to the memory device 10 to facilitate the transmission and receipt of data to be written to or read from the memory device 10.

As will be appreciated, the command interface 14 may include a number of circuits, such as a clock input circuit 18 and a command address input circuit 20, for instance, to ensure proper handling of the signals 15. The command interface 14 may receive one or more clock signals from an external device. Generally, double data rate (DDR) memory utilizes a differential pair of system clock signals, referred to herein as the true clock signal (Clk_t) and the complementary clock signal (Clk_c). The positive clock edge for DDR refers to the point where the rising true clock signal Clk_t crosses the falling complementary clock signal Clk_c, while the negative clock edge indicates that transition of the falling true clock signal Clk_t and the rising of the complementary clock signal Clk_c. Commands (e.g., read command, write command, etc.) are typically entered on the positive edges of the clock signal and data is transmitted or received on both the positive and negative clock edges.

The clock input circuit 18 receives the true clock signal (Clk_t) and the complementary clock signal (Clk_c) and generates an internal clock signal CLK. The internal clock signal CLK is supplied to an internal clock generator 30, such as a delay locked loop (DLL) circuit. The internal clock generator 30 generates a phase controlled internal clock signal LCLK based on the received internal clock signal CLK. The phase controlled internal clock signal LCLK is supplied to the TO interface 16, for instance, and is used as a timing signal for determining an output timing of read data.

The internal clock signal CLK may also be provided to various other components within the memory device 10 and may be used to generate various additional internal clock signals. For instance, the internal clock signal CLK may be provided to a command decoder 32. The command decoder 32 may receive command signals from the command bus 34 and may decode the command signals to provide various internal commands. For instance, the command decoder 32 may provide command signals to the internal clock generator 30 over the bus 36 to coordinate generation of the phase controlled internal clock signal LCLK. The phase controlled internal clock signal LCLK may be used to clock data through the IO interface 16, for instance.

Further, the command decoder 32 may decode commands, such as read commands, write commands, mode-register set commands, activate commands, etc., and provide access to a particular memory bank 12 corresponding to the command, via bus path 40. As will be appreciated, the memory device 10 may include various other decoders, such as row decoders and column decoders, to facilitate access to the memory banks 12. In one embodiment, each memory bank 12 includes a bank control block 22 which provides the necessary decoding (e.g., row decoder and column decoder), as well as other features, such as timing control and data control, to facilitate the execution of commands to and from the memory banks 12.

The memory device 10 executes operations, such as read commands and write commands, based on the command/address signals received from an external device, such as a processor. In one embodiment, the command/address bus may be a 14-bit bus to accommodate the command/address signals (CA<13:0>). The command/address signals are clocked to the command interface 14 using the clock signals (Clk_t and Clk_c). The command interface may include a command address input circuit 20 which is configured to receive and transmit the commands to provide access to the memory banks 12, through the command decoder 32, for instance. In addition, the command interface 14 may receive a chip select signal (CS_n). The CS_n signal enables the memory device 10 to process commands on the incoming CA<13:0> bus. Access to specific banks 12 within the memory device 10 is encoded on the CA<13:0> bus with the commands.

In addition, the command interface 14 may be configured to receive a number of other command signals. For instance, a command/address on die termination (CA_ODT) signal may be provided to facilitate proper impedance matching within the memory device 10. A reset command (RESET n) may be used to reset the command interface 14, status registers, state machines and the like, during power-up for instance. The command interface 14 may also receive a command/address invert (CAI) signal which may be provided to invert the state of command/address signals CA<13:0> on the command/address bus. A mirror (MIR) signal may also be provided to facilitate a mirror function. The MIR signal may be used to multiplex signals so that they can be swapped for enabling certain routing of signals to the memory device 10, based on the configuration of multiple memory devices in a particular application. Various signals to facilitate testing of the memory device 10, such as the test enable (TEN) signal, may be provided, as well. For instance, the TEN signal may be used to place the memory device 10 into a test mode for connectivity testing.

The command interface 14 may also be used to provide an alert signal (ALERT_n) to the system processor or controller for certain errors that may be detected. For instance, an alert signal (ALERT_n) may be transmitted from the memory device 10 if a cyclic redundancy check (CRC) error is detected. Other alert signals may also be generated. Further, the bus and pin for transmitting the alert signal (ALERT_n) from the memory device 10 may be used as an input pin during certain operations, such as the connectivity test mode executed using the TEN signal, as described above.

Data may be sent to and from the memory device 10, utilizing the command and clocking signals discussed above, by transmitting and receiving data signals 44 through the IO interface 16. More specifically, the data may be sent to or retrieved from the memory banks 12 over the data path 42, which includes a plurality of bi-directional data buses. IO data signals 44, generally referred to as DQ signals, are generally transmitted and received in one or more bi-directional data busses. For certain memory devices, such as a DDR5 SDRAM memory device, the IO signals may be divided into upper and lower bytes. For instance, for an X16 memory device (e.g., X16 DDR5 SDRAM), the IO signals may be divided into upper and lower IO signals (e.g., DQ<15:8> and DQ<7:0>) corresponding to upper and lower bytes of the data signals, for instance.

To allow for higher data rates within the memory device 10, certain memory devices, such as DDR memory devices may utilize data strobe signals, generally referred to as DQS signals. The DQS signals are driven by the external processor or controller sending the data (e.g., for a write command) or by the memory device 10 (e.g., for a read command). For read commands, the DQS signals are effectively additional data output (DQ) signals with a predetermined pattern. For write commands, the DQS signals are used as clock signals to capture the corresponding input data. As with the clock signals (Clk_t and Clk_c), the data strobe (DQS) signals may be provided as a differential pair of data strobe signals (DQS t as the true data strobe signal and DQS_c as the complimentary data strobe signal) to provide differential pair signaling during reads and writes. For certain memory devices, such as a DDR5 SDRAM memory device, the differential pairs of DQS signals may be divided into upper and lower data strobe signals (e.g., UDQS_t as the true upper DQS signal and UDQS_c as the complimentary upper DQS signal; LDQS_t as the true lower DQS signal and LDQS_c as the complimentary lower DQS signal) corresponding to upper and lower bytes of data sent to and from the memory device 10, for instance.

The data (e.g., data signals 44) for read and writes may be addressed to certain memory (e.g., memory cells) in the memory banks 12. The techniques described herein provide for fault detection of the data in the data signals 44, for example, by using error detection circuitry 46. In some embodiments, Cyclic Redundancy Check (CRC) error detection techniques can be performed using the error detection circuitry 46 on the data of the data signals 44. In this manner, the error detection circuitry 46 may include logic and/or circuitry that may enable the detection of certain errors in the data signals 44, for example, during a data write to the memory device 10. While the error detection circuitry 46 is illustrated in the IO interface 16, it should be appreciated that this location may be for illustrative purposes and the circuitry of the error detection circuitry may be present in other and/or additional locations of the memory device 10.

In operation, a controller generates the CRC checksum and forms the write data frames. For X8 devices, write CRC can be enabled or disabled independently per nibble. Two separate write CRC enable mode register bits (for upper and lower nibbles) are defined. When at least one of two write CRC enable bits is set to 1, the timings of write CRC enable mode are applied to by the error detection circuitry 46 (i.e., both nibbles). When write CRC is enabled in one nibble and disabled in the other nibble in an X8 device, CRC errors are not checked on the disabled nibble; therefore, the ALERT_n signal and any internal status bit related to the CRC error is not impacted by the disabled nibble.

For X4 and X16 devices, only one of two write CRC enable bits is used, as defined in a mode register while the unused write CRC enable bit can be don't care. The error detection circuitry 46 checks for an error in received code words per each write CRC-enabled nibble by comparing the received checksum against the computed checksum. Errors are reported using the ALERT_n signal if there is a mismatch in any nibble. The error detection circuitry 46 memory device 10 can write data to the core without waiting for a CRC check for full writes. If bad data is written to the core, as identified by the CRC match and signaled on ALERT_n, a controller retries the transaction and overwrites the bad data.

Additional signals may be received by the IO interface 16. For example, an impedance (ZQ) calibration signal may also be provided to the memory device 10 through the IO interface 16. The ZQ calibration signal may be provided to a reference pin and used to tune output drivers and ODT values by adjusting pull-up and pull-down resistors of the memory device 10 across changes in process, voltage and temperature (PVT) values. Because PVT characteristics may impact the ZQ resistor values, the ZQ calibration signal may be provided to the ZQ reference pin to be used to adjust the resistance to calibrate the input impedance to known values. As will be appreciated, a precision resistor is generally coupled between the ZQ pin on the memory device 10 and GND/VSS external to the memory device 10. This resistor acts as a reference for adjusting internal ODT and drive strength of the IO pins.

In addition, a loopback signal (LOOPBACK) may be provided to the memory device through the IO interface 16. The loopback signal may be used during a test or debugging phase to set the memory device 10 into a mode wherein signals are looped back through the memory device 10 through the same pin. For instance, the loopback signal may be used to set the memory device 10 to test the data output (DQ) of the memory device 10. Loopback may include both a data and a strobe or possibly just a data pin. This is generally intended to be used to monitor the data captured by the memory device 10 at the IO interface 16.

As will be appreciated, various other components such as power supply circuits (for receiving external VDD and VSS signals), mode registers (to define various modes of programmable operations and configurations), read/write amplifiers (to amplify signals during read/write operations), temperature sensors (for sensing temperatures of the memory device 10), etc., may also be incorporated into the memory device 10. Accordingly, it should be understood that the block diagram of FIG. 1 is only provided to highlight certain functional features of the memory device 10 to aid in the subsequent detailed description.

Indeed, one aspect of the operation of the memory device 10 includes an automatic disable function of an error detection operation performed utilizing the error detection circuitry 46, for example, on the data of the data signals 44. For example, the memory device 10 may include write CRC auto-disable functionality. The write CRC auto-disable mode can be enabled by programming a CRC auto-disable mode register of the memory device 10 with an enable bit (e.g., a "1"). When enabled, the memory device 10 operates to count the number of write CRC error occurrences, regardless of the memory device configuration (e.g., X4, X8, or X16 memory chips). When the number of write CRC errors occurring within a write CRC auto-disable window exceeds a predetermined threshold value as a write CRC auto-disable threshold value (e.g., a value set between 0 and 127, which may be programmed in a CRC auto-disable threshold register), disabling of write CRC error checking of all nibbles is performed and a write CRC auto-disable status bit is enabled (e.g., set to "1") in a CRC auto-disable status register.

To exceed the write CRC auto-disable threshold value, the number of write CRC errors must occur within a write CRC auto-disable window. Unless the write CRC auto-disable status bit is set (e.g., enabled), a (write) CRC error counter (e.g., of the error detection circuitry 46) is reset after a predetermined number of writes (e.g., between 0 and 127, where 0 equates to an infinite window) as programmed in a write register, so that the write CRC error count will accumulate during each write CRC auto-disable window. Once the write CRC auto-disable status bit is set, the write CRC error checking is not re-enabled at the end of the write CRC auto-disable window, even as the write CRC error counter is reset below the threshold value.

Write CRC error checking can be re-enabled by resetting the write CRC auto-disable status bit in the CRC auto-disable status register to 0. This will reset the write CRC error counter and restart the write CRC auto-disable window. Prior to changing the write CRC auto-disable threshold value (as programmed in the CRC auto-disable threshold register) or the write CRC auto-disable window (as programmed in the a write register), disabling of the write CRC auto-disable mode can be accomplished by setting a disable bit (e.g., a "0") in the CRC auto-disable mode register. Once the updated values have been programmed in, for example, the CRC auto-disable threshold register and/or the write register, the write CRC auto-disable mode can be (re) enabled by programming the CRC auto-disable mode register with an enable bit (e.g., a "1").

Disabling the write CRC auto-disable mode, if enabled, resets the write CRC error counter and restarts the write CRC auto-disable window. However, if the write CRC auto-disable status bit in the CRC auto-disable status register had previously been enabled, the write CRC auto-disable status bit in the CRC auto-disable status register is disabled to resume error counting. Changes to the write CRC auto-disable threshold (e.g., in the CRC auto-disable threshold register) and the write window (e.g., the value in the write register) settings may occur when the CRC write auto-disable mode is disabled in the CRC auto-disable mode register. When write CRC auto-disable mode is disabled (e.g., in the CRC auto-disable mode register), the write CRC error counter may remain at reset values even if write CRC errors occur.

The CRC error counter (e.g., of the error detection circuitry 46) does not always increment for every write command, but when it does, the timing relationship between count-triggers for each of the CRC write counter (e.g., of the error detection circuitry 46) and a CRC error counter (e.g., of the error detection circuitry 46) should be predictable for the error detection circuitry 46 circuit to work across all speed-grades of types of the memory devices. Because, for example, X4 DDR5 SDRAM and X8 DDR5 SDRAM operate in the same DQS timing domain, the above mentioned count triggers (e.g., control signals) have a predictable timing relationship. However, with respect to X16 DDR5 SDRAM, for example, detected errors in the data of the data signals 44 can come from lower DQ or upper DQ whose DQS timing domain can be quite far apart due to, for example, write leveling training and/or DQS min/max timing. Thus, circuitry and techniques to increase the timing relationship between count triggers (e.g., control signals) for each of the (write) CRC error counter (e.g., of the error detection circuitry 46) and a CRC write counter (e.g., of the error detection circuitry 46) can be implemented, as will be discussed in greater detail below.

Figure 2:
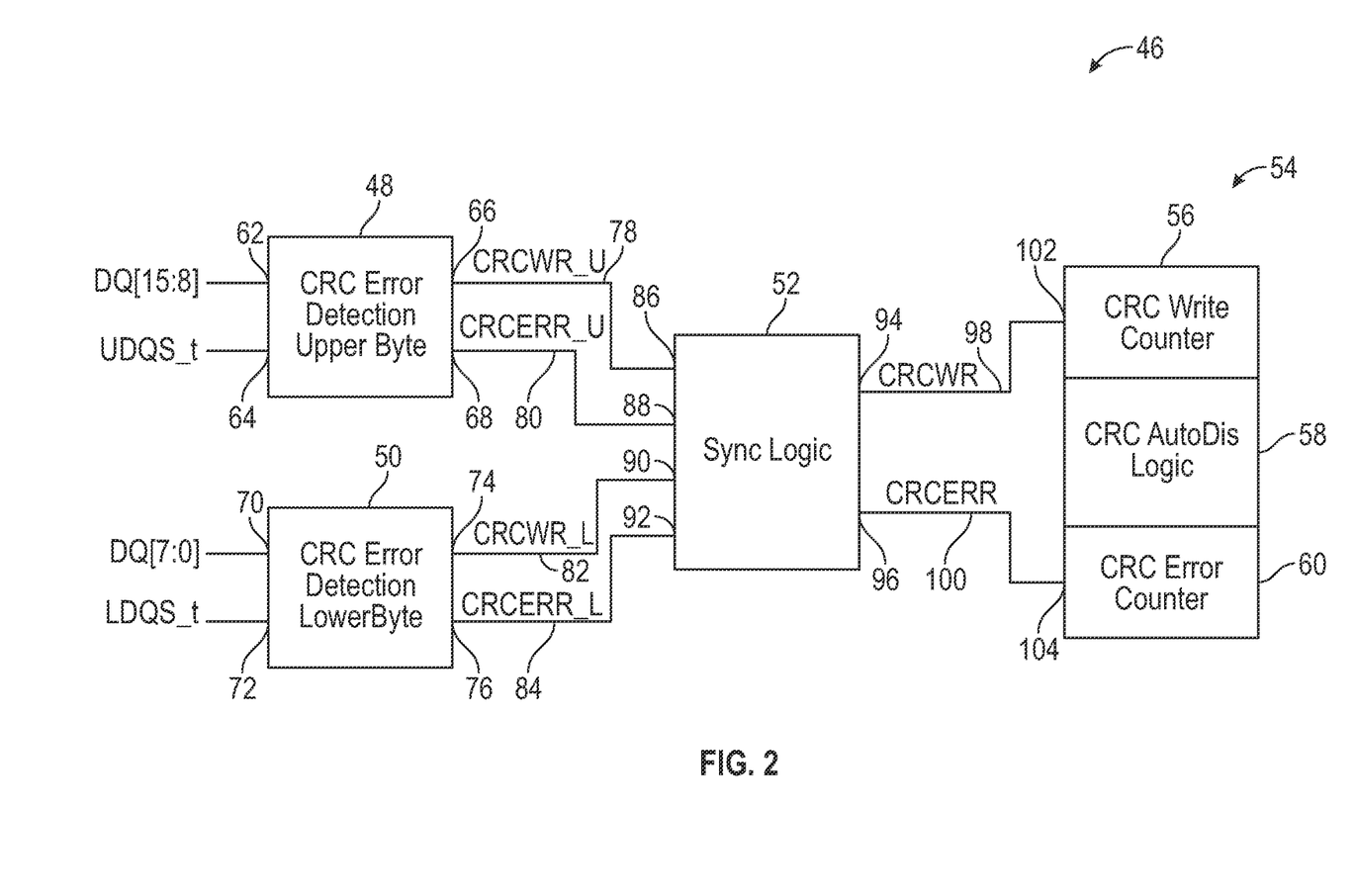
FIG. 2 is a schematic diagram of the error detection circuitry of the memory device of FIG. 1, according to an embodiment of the present disclosure.

FIG. 2 illustrates particular elements of the error detection circuitry 46 utilized in conjunction with a CRC error detection technique for the memory device 10. As illustrated, the error detection circuitry 46 includes an upper byte error detection circuit 48, a lower byte error detection circuit 50, a sync logic circuit 52, and an error detection output circuit 54. As will be discussed in greater detail below, the error detection output circuit 54 may additionally include a CRC write counter circuit 56, a CRC auto-disable logic 58, and a CRC error counter circuit 60 (e.g., a write CRC error counter). The upper byte error detection circuit 48 may include input 62 that receives the upper byte portion of data signals 44 as well as input 64 that receives UDQS_t as the true upper DQS signal used, for example, as a clock signal to capture the corresponding input data received at input 62. Inputs 62 and 64 may be pins or other connectors that receive signals from a respective path coupled thereto. The upper byte error detection circuit 48, in some embodiments, includes CRC error detection circuitry that detects errors in the upper byte portion of data signals 44 received at input 62 when the upper byte error detection circuit 48 is in operation.

The upper byte error detection circuit 48 additionally includes an output 66 (e.g., a pin or other connector) from which the upper byte error detection circuit 48 transmits a write signal (CRCWR_U) that corresponds to, for example, a period of time in which the write of the upper byte of the data signals 44 is being transmitted to the upper byte error detection circuit 48. The upper byte error detection circuit 48 additionally includes an output 68 (e.g., a pin or other connector) from which a CRC error signal (CRCERR_U) is transmitted. CRCERR_U corresponds to, for example, one or more errors detected in the upper byte portion of data signals 44 by the upper byte error detection circuit 48.

Similarly, the lower byte error detection circuit 50 may include input 70 that receives the lower byte portion of data signals 44 as well as input 72 that receives LDQS_t as the true lower DQS signal used, for example, as a clock signal to capture the corresponding input data received at input 70. Inputs 70 and 72 may be pins or other connectors that receive signals from a respective path coupled thereto. The lower byte error detection circuit 50, in some embodiments, includes CRC error detection circuitry that detects errors in the lower byte portion of data signals 44 received at input 70 when the lower byte error detection circuit 50 is in operation.

The lower byte error detection circuit 50 additionally includes an output 74 (e.g., a pin or other connector) from which the lower byte error detection circuit 50 transmits a write signal (CRCWR_L) that corresponds to, for example, a period of time in which the write of the lower byte of the data signals 44 is being transmitted to the lower byte error detection circuit 50. The lower byte error detection circuit 50 additionally includes an output 76 (e.g., a pin or other connector) from which a CRC error signal (CRCERR_L) is transmitted. CRCERR_L corresponds to, for example, one or more errors detected in the lower byte portion of data signals 44 by the lower byte error detection circuit 50.

As illustrated, path 78 is coupled to output 66, path 80 is coupled to output 68, path 82 is coupled to output 74, and path 84 is coupled to output 76. Each of path 78, 80, 82, and 84, as illustrated, is respectively coupled to input 86, input 88, input 90, and input 92 (i.e., pins or other connectors) of the sync logic circuit 52. In this manner, the sync logic circuit 52 operates to receive CRCWR_U and CRCERR_U from the upper byte error detection circuit 48 as transmitted along paths 78 and 80 and received at inputs 86 and 88, respectively. Likewise, the sync logic circuit 52 operates to receive CRCWR_L and CRCERR_L from the lower byte error detection circuit 50 as transmitted along paths 82 and 84 and received at inputs 90 and 92, respectively.

The sync logic circuit 52, in some embodiments, includes logic and/or circuitry that allows for synchronization of control signals (e.g., toggle signals) generated by the sync logic circuit 52. That is the UDQS_t and LDQS_t signals as received at inputs 64 and 72 may operate with separate timing domains. Thus, CRCWR_U and CRCERR_U may have different timings from CRCWR_L and CRCERR_L (e.g., due to their generation being at least in part based upon the respectively received UDQS_t and LDQS_t signals). Accordingly, the sync logic circuit 52, when in operation, both generates control signals based upon CRCWR_U, CRCERR_U, CRCWR_L, and CRCERR_L and operates to synchronize the control signals that are generated _U and CRCERR_U may have different timings from CRCWR_L and CRCERR_L can synchronize the control signals generated to allow for proper functioning of the error detection circuitry 46.

The sync logic circuit 52 additionally includes an output 94 (e.g., a pin or other connector) from which the sync logic circuit 52 transmits a CRC write control signal (CRCWR)

that corresponds to, for example, a toggle signal that triggers a count (e.g., a clock signal as a control signal) in the CRC write counter circuit 56. Likewise, the sync logic circuit 52 includes an output 96 (e.g., a pin or other connector) from which the sync logic circuit 52 transmits a CRC error control signal (CRCER) that corresponds to, for example, a toggle signal that triggers a count (e.g., a clock signal as a control signal) in the CRC error counter circuit 60. As noted above, in operation, the sync logic circuit 52 synchronizes the timing of the CRCWR and the CRCERR (e.g., the timing of the CRCWR and the CRCERR are both active at the same time or at approximately the same time when an error is detected in the data signals 44 as an example, of synchronizing signals).

As further illustrated, path 98 is coupled to output 94 and path 100 is coupled to output 96. Each of path 98 and path 100, as illustrated, is respectively coupled to input 102 and input 104 (i.e., pins or other connectors) of the error detection output circuit 54, more specifically of the CRC write counter circuit 56 and the CRC error counter circuit 60. In operation, the CRC write counter circuit 56 includes circuitry (e.g., counter circuitry) that utilizes the CRCWR as a control signal (e.g., a toggle signal or clock signal) and its operation is determined by, for example, the programmed value stored in the write register discussed previously. Likewise, in operation, the CRC error counter circuit 60 includes circuitry (e.g., counter circuitry) that utilizes the CRCERR as a control signal (e.g., a toggle signal or clock signal) occurring within a write CRC, for example, during a write window. Moreover, as discussed previously, these control signals, as synchronized, additionally allow for proper functionality of an auto When the error detection circuitry 46 detects a CRC error on received code words in any nibble, it drives the ALERT_n signal to 0 for 12 to 20 clocks (e.g., as an output generated from the error detection output circuit 54 and/or one or more of the count values generated in the error detection output circuit 54). Additionally, as discussed above, one aspect of the operation of the memory device 10 includes an automatic disable function (or auto-disable function) of an error detection operation performed utilizing the error detection circuitry 46, for example, on the data of the data signals 44. In some embodiments, the auto-disable functionality may be performed, at least in part, utilizing the CRC auto-disable logic 58. For example, the CRC auto-disable logic 58 can include one or more of the CRC auto-disable mode register, the CRC auto-disable status register, the CRC auto-disable threshold register, and the write register, each previously discussed. In this manner, the CRC auto-disable logic 58 when in operation is utilized in an automatic disable function of an error detection operation as well as, for example, re-enabling write CRC error checking by the techniques previously described utilizing by resetting the write CRC auto-disable status bit in the CRC auto-disable status register to 0.

While the CRC error counter circuit 60 does not always increment for every write command (e.g., when no errors are detected). However, when the CRC error counter circuit 60 is incremented, the timing relationship between count triggers (e.g., control signals) for each of the CRC error counter circuit 60 and the CRC write counter circuit 56 should be predictable for the error detection circuitry 46 circuit to work across all speed-grades of types of memory devices 10. As discussed above, the sync logic circuit 52 can be utilized to synchronize timing relationship between count triggers (e.g., CRCWR and CRCER) for each of the CRC write counter circuit 56 and the CRC error counter circuit 60.

Figure 3:
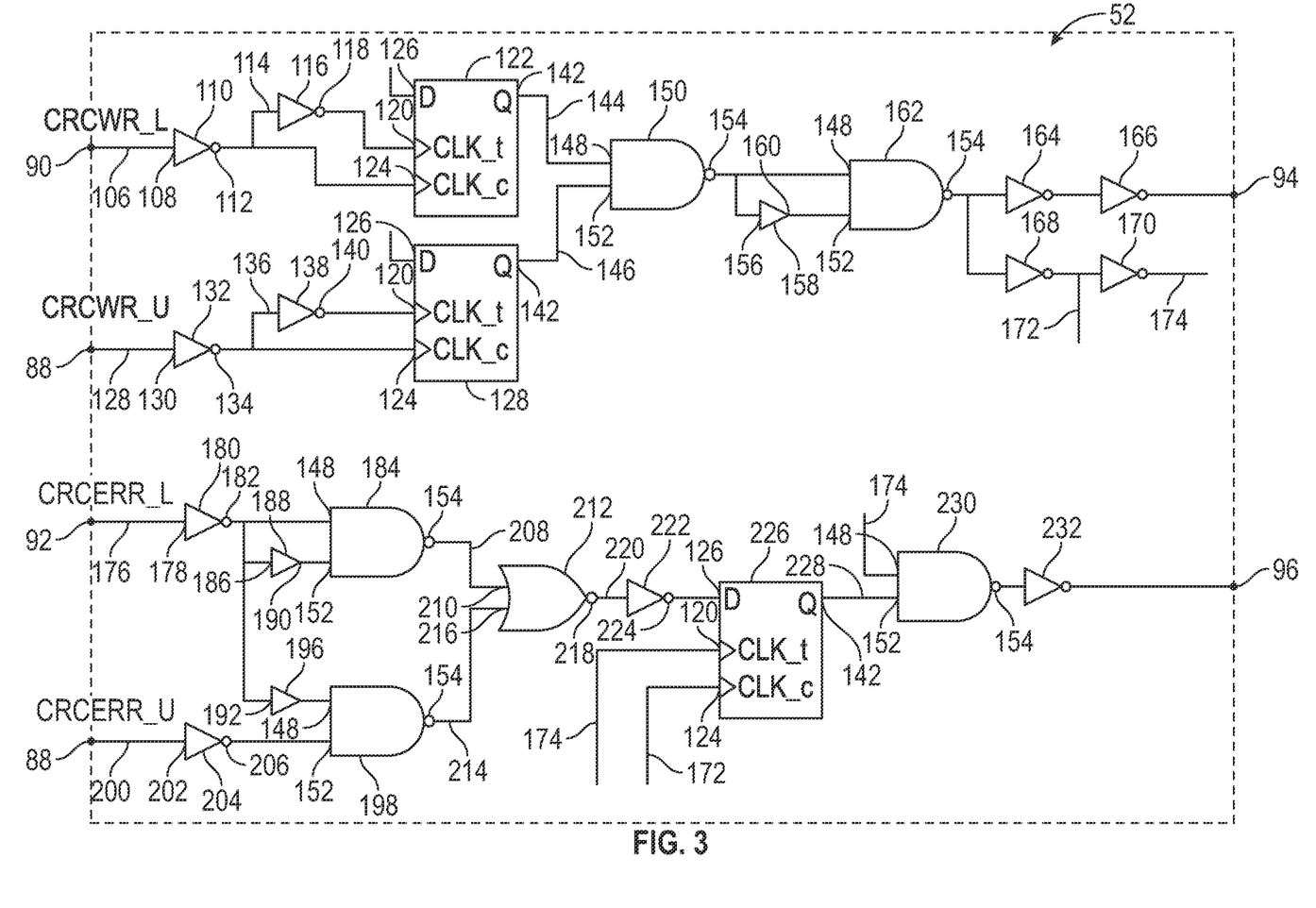
FIG. 3 is a schematic diagram of the sync logic circuitry of the error detection circuitry of FIG. 2, according to an embodiment of the present disclosure.

FIG. 3 illustrates particular elements of the sync logic circuit 52 utilized to synchronize the CRCWR and CRCERR that are transmitted from outputs 94 and 96, respectively. It should be noted that the elements of the sync logic circuit 52 of FIG. 3 are illustrative of one circuit diagram that operates to generate synchronize CRCWR and CRCERR as transmitted from outputs 94 and 96, respectively. However, the illustrated example is only one configuration to generate synchronized CRCWR and CRCERR for transmission from output 94 and 96, respectively and other configurations are contemplated.

As illustrated, the sync logic circuit 52 receives the CRCWR_L at input 90 and transmits CRCWR_L along path 106 to input 108 (e.g., a pin or connector) of inverter 110. Inverter 110 operates to invert CRCWR_L and transmits the inverted signal from output 112 (e.g., a pin or connector) to input 114 (e.g., a pin or connector) of inverter 116. Inverter 116 operates to invert the received inverted signal from output 112 and transmits the resultant signal from output 118 (e.g., a pin or connector) to input 120 (e.g., a pin or connector) of D flip-flop 122. Input 120 of D flip-flop 122, as illustrated, is a true clock signal (Clk_t) input.

Additionally, inverter 110 transmits the resultant signal from output 112 to input 124 (e.g., a pin or connector) of D flip-flop 122. Input 124 of D flip-flop 122, as illustrated, is a complimentary clock signal (Clk_t) input. The D flip-flop 122 additionally includes input 126 (e.g., a pin or connector) that can be coupled to a voltage source or other element to receive a biary high value (e.g., "1").

Similarly, the sync logic circuit 52, receives the CRCWR_U at input 86 and transmits CRCWR_L along path 127 to input 130 (e.g., a pin or connector) of inverter 132. Inverter 132 operates to invert CRCWR_U and transmits the inverted signal from output 134 (e.g., a pin or connector) to input 136 (e.g., a pin or connector) of inverter 138. Inverter 138 operates to invert the received inverted signal from output 134 and transmits the resultant signal from output 140 (e.g., a pin or connector) to input 120 of D flip-flop 122. Input 120 of D flip-flop 122, as illustrated, is a true clock signal (Clk_t) input.

Additionally, inverter 132 transmits the resultant signal from output 134 to input 124 of D flip-flop 128. Input 124 of D flip-flop 128, as illustrated, is a complimentary clock signal (Clk_t) input. The D flip-flop 128 additionally includes input 126 that can be coupled to a voltage source or other element to receive a biary high value (e.g., "1").

Each of the D flip-flop 122 and the D flip-flop 128 includes an output 142 (e.g., a pin or connector). Output 142 of the D flip-flop 122 is coupled to path 144 while output 142 of the D flip-flop 128 is coupled to path 146. In operation, each of the of the D flip-flop 122 and the D flip-flop 128 output a respective high signal (e.g., based on the binary high value received at their respective input 126) as controlled by input 120, which in turn, is based on the received CRCWR_L and CRCWR_U (since these signals are tied to the respective true clock inputs of the D flip-flop 122 and the D flip-flop 128). In this manner, the D flip-flop 122 and the D flip-flop 128 resolve differences in the timing of the UDQS_t and LDQS_t, the inputs to the respective true clock inputs of the D flip-flop 122 and the D flip-flop 128 each receive signals based upon respective UDQS_t and LDQS_t. The D flip-flop 122 and the D flip-flop 128 operate to synchronize the signals generated and transmitted from outputs 142 to insure that the slower of UDQS_t and LDQS_t sets (i.e., is utilized as) the timing of the sync logic circuit 52.

Path 144 is coupled to an input 148 (e.g., a pin or connector) of NAND gate 150 and path 146 is coupled to an input 152 (e.g., a pin or connector) of NAND gate 150. Because NAND gate 150 outputs (via output 154, e.g., a pin or connector, of NAND gate 150) a binary low value (e.g., "0") only when each of input 148 and input 152 each receives a binary high value, the NAND gate 150 will only output a binary low value when each of the D flip-flop 122 and the D flip-flop 128 transmits a binary high value (e.g., subsequent to each input 120 of the D flip-flop 122 and the D flip-flop 128 receiving a high signal). In this manner, by tying the generated signal of the D flip-flop 122 and the D flip-flop 128 (e.g., issued from respective output 142) to the CRCWR_L and CRCWR_U, timing differences between CRCWR_L and CRCWR_U can be alleviated (i.e., the timing will be synched up to whichever of UDQS_t and LDQS_t has the slower timing as controlling the resultant second binary high output to NAND gate 150, causing output of a binary low signal from output 154 of the NAND gate 150 as a synchronized CRC write signal).

The synchronized CRC write signal is transmitted from the output 154 of the NAND gate 150 to input 156 (e.g., a pin or connector) of buffer 158. Buffer 158 operates, for example, to increase the drive capability of the synchronized CRC write signal and transmits the resultant signal from output 160 (e.g., a pin or connector) to input 152 of NAND gate 162. Additionally, the synchronized CRC write signal is transmitted from the output 154 of the NAND gate 150 to input 148 of NAND gate 162. Because NAND gate 163 receives the synchronized CRC write signal and the buffered synchronized CRC write signal at input 148 and input 152, respectively, NAND gate 162 transmits from output 154 a binary high value as an output signal when the synchronized CRC write signal is binary low value and transmits from output 154 a binary low value as an output signal when the synchronized CRC write signal is a binary high value. This output signal is inverted by inverter 164 and reinverted by inverter as the CRCWR transmitted from output 94 of the sync logic circuit 52.

Inverter 164 and 166 can be used to match the timing delay caused by inverter 168 and inverter 170 to the output signal transmitted from output 154. In some embodiments, inverter 168 inverts the output signal transmitted from output 154 and transmits the result along path 172 while inverter 170 inverts the output transmitted from inverter 168 and transmit the result along path 174.

As additionally illustrated, the sync logic circuit 52 receives the CRCERR_L at input 92 and transmits CRCERR_L along path 176 to input 178 (e.g., a pin or connector) of inverter 180. Inverter 180 operates to invert CRCERR_L and transmits the inverted signal from output 182 (e.g., a pin or connector) to input 148 of NAND gate 184. Additionally, inverter 180 transmits the inverted signal from output 182 to input 186 (e.g., a pin or connector) of buffer 188. Buffer 188 operates, for example, to increase the drive capability of the signal received at input 186 and transmits the resultant signal from output 190 (e.g., a pin or connector) to input 152 of the NAND gate 184. Likewise, inverter 180 transmits the inverted signal from output 182 to input 192 (e.g., a pin or connector) of buffer 194. Buffer 194 operates, for example, to increase the drive capability of the signal received at input 192 and transmits the resultant signal from output 196 (e.g., a pin or connector) to input 148 of the NAND gate 198.

The sync logic circuit 52 also receives the CRCERR_U at input 88 and transmits CRCERR_U along path 200 to input 202 (e.g., a pin or connector) of inverter 204. Inverter 204 operates to invert CRCERR_U and transmits the inverted signal from output 206 (e.g., a pin or connector) to input 152 of NAND gate 198. Output 154 of NAND gate 184 is coupled via path 208 to input 210 (e.g., a pin or connector) of NOR gate 212. Similarly, output 154 of NAND gate 198 is coupled via path 214 to input 216 (e.g., a pin or connector) of NOR gate 212. Output 218 (e.g., a pin or connector) of NOR gate 212 is coupled to input 220 (e.g., a pin or connector) of inverter 222. Inverter 222 operates to invert the result from the NOR gate 212 as transmitted from output 218 transmits the inverted signal from output 224 (e.g., a pin or connector) to input 126 of D flip-flop 226.

Due to the configuration of the circuitry coupled to the input 148 and 152 of the NAND gate 184 and 198, if either (or both) of CRCERR_L and CRCERR_U are a binary high value (i.e., representing one or more detected errors in the lower byte portion of data signals 44 and/or one or more detected errors in the upper byte portion of data signals 44, respectively), the output generated by the NOR gate 212 will be a binary low value. This is subsequently inverted by inverter 222 as a high signal to the input 126 of D flip-flop 226. Likewise, if both of CRCERR_L and CRCERR_U are a binary low value (i.e., representing no detected errors in the lower byte portion of data signals 44 and no detected errors in the upper byte portion of data signals 44, respectively), the output generated by the NOR gate 212 will be a binary high value. This is subsequently inverted by inverter 222 as a low signal to the input 126 of D flip-flop 226.

The D flip-flop 226 additionally includes input 120 as a true clock signal (Clk_t) input and input 124 as a complimentary clock signal (Clk_t) input. Furthermore, as illustrated, input 120 is coupled to path 174 while input 124 is coupled to path 172. This insures that the D flip-flop 226 (as well as the portions of the sync logic circuit 52 described above as operating on CRCERR_L and CRCERR_U) is synchronized in operation with the portions of the sync logic circuit 52 described above as operating on CRCWR_L and CRCEWR U. The D flip-flop 226 additionally includes an output 142. In operation, the D flip-flop 226 outputs a high binary value on path 228 (e.g., based on a binary high value received at its input 126 which in turn, is based on the received CRCERR_L and/or CRCERR_U indicating an error in the data signals 44) as clocked by the signal received from path 174. Likewise, the D flip-flop 226 outputs a low binary value on path 228 (e.g., based on a low binary value received at its input 126 which in turn, is based on the received CRCERR_L and CRCERR_U both indicating no error in the data signals 44) as clocked by the signal received from path 174.

The output signal from the D flip-flop 226 transmitted on path 228 it transmitted to input 152 of the NAND gate 230. The signal received from path 174 is additionally transmitted to input 148 of NAND gate 230. Thus, the same signal (synchronized with the operation of the portions of the sync logic circuit 52 described above as operating on CRCERR_L and CRCERR_U) controls the output 154 of the NAND gate 230. That is, the output 154 of the NAND gate 230 will transmit a binary high value whenever the signal received from path 174 is a binary low value and/or whenever the signal along path 228 from the D flip-flop 226 is a binary low value. This value transmitted from the output 154 of the NAND gate 230 is inverted by inverter 232 as the CRCERR transmitted from output 96 of the sync logic circuit 52.

Indeed, the output 154 of the NAND gate 230 will only transmit a binary low value whenever the signal received from path 174 is a binary high value and the signal along path 228 from the D flip-flop 226 is a binary high value. This value transmitted from the output 154 of the NAND gate 230 is inverted by inverter 232 as the CRCERR transmitted from output 96 of the sync logic circuit 52 as a binary high value, indicating at least one detected error. Moreover, as noted above, the CRCERR transmitted from output 96 as a control signal (e.g., a toggle signal or clocking signal) is synchronized with the CRCWR transmitted from output 94.

As previously discussed, the detected error (e.g., a CRC detected error) can come from either DQ-byte (e.g., DQ<15:8> or DQ<7:0>). However, to insure proper functionality of the error detection circuitry 46, it may be advantageous to have the control signal (e.g., CRCWR as the toggle signal or clock signal) for the CRC write counter circuit 56 and the control signal (e.g., CRCERR as the toggle signal or clock signal) for the CRC error counter circuit 60 should be in sync (e.g., synchronized) with consistent timing. This allows for correct function of the error detection circuitry 46 and, accordingly, the memory device across, for example, different clock speeds and process corners. As described above, utilization of the sync logic circuit 52 in the error detection circuitry 46 allows for following of the timing from either LDQS_t or UDQS_t, whichever is slower. To better illustrate this operation, instances having a slower LDQS_t with respect to UDQS_t are illustrated below with respect to FIGS. 4-6.

Figure 4:
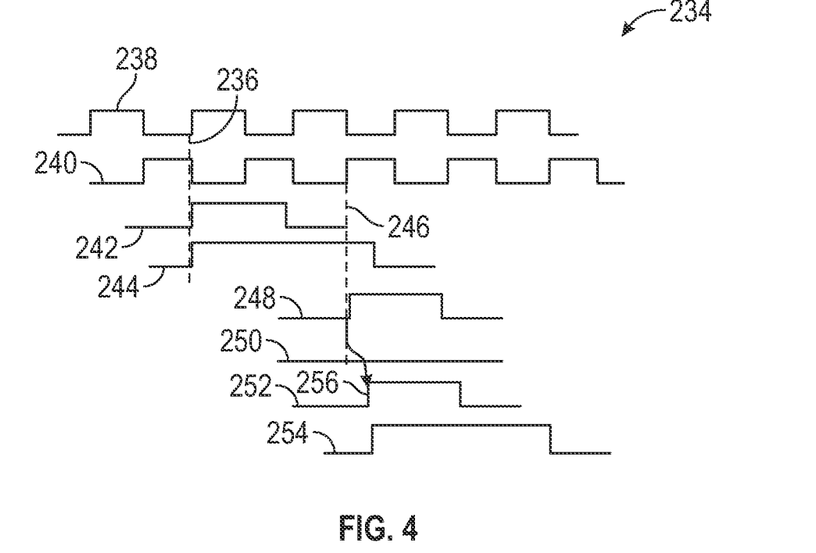
FIG. 4 is a first timing diagram illustrating generation of toggle signals for the CRC write counter and the CRC error counter of the error detection circuitry of FIG. 2, in accordance with an embodiment.

FIG. 4 illustrates a timing diagram 234 illustrating generation of toggle signals (e.g., CRCWR and CRCERR) for the CRC write counter circuit 56 and the CRC error counter circuit respectively. As illustrated, for example, at time 236, the UDQS_t 238 leads the LDQS_t 240 (i.e. CRCWR_U and CRCERR_U will be generated prior to CRCWR_L and CRCERR_L). CRCWR_U 242 and CRCERR_U 244 are additionally illustrated. As appreciated with respect to CRCERR_U 244, the timing diagram 234 illustrates an example in which an error (e.g., a CRC error) is detected in the upper DQ-byte (e.g., DQ<15:8>). For example, as noted by the rise of CRCERR_U 244 to a binary high value subsequent to time 236, at least one error is detected in the upper DQ-byte.

As additionally illustrated, for example, at time 246, the LDQS_t 240 causes the generation of CRCWR_L 248 and CRCERR_L 250. As appreciated with respect to CRCERR_L 250, no error is detected in the lower DQ-byte (e.g., DQ<7:0>), since CRCERR_L 250 remains at a binary low value. The timing diagram 234 further illustrates the generated toggle signals CRCWR 252 and CRCERR 254 as being generated subsequent to each of the generation of CRCWR_U 242, CRCERR_U 244, CRCWR_L 248, and CRCERR_L 250. Moreover, through use of the sync logic circuit 52 in the manner discussed previously, CRCWR 252 and CRCERR 254 are synchronized, as illustrated at point 256.

Figure 5:
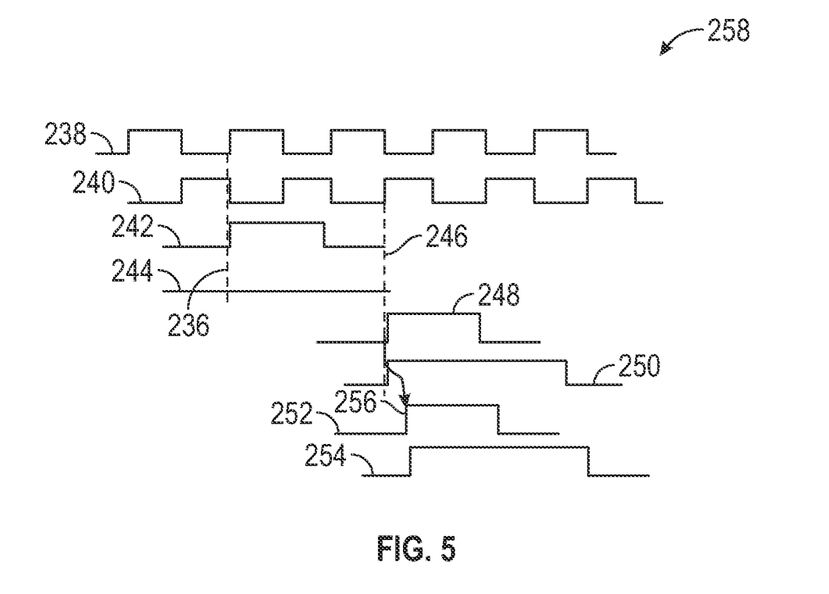
FIG. 5 is a second timing diagram illustrating generation of toggle signals for the CRC write counter and the CRC error counter of the error detection circuitry of FIG. 2, in accordance with an embodiment.

FIG. 5 illustrates a timing diagram 258 illustrating generation of toggle signals (e.g., CRCWR and CRCERR) for the CRC write counter circuit 56 and the CRC error counter circuit respectively. As illustrated, for example, at time 236, the UDQS_t 238 leads the LDQS_t 240 (i.e. CRCWR_U and CRCERR_U will be generated prior to CRCWR_L and CRCERR_L). CRCWR_U 242 and CRCERR_U 244 are additionally illustrated. As appreciated with respect to CRCERR_U 244, no error is detected in the upper DQ-byte (e.g., DQ<15:8>)>), since CRCERR_L 250 remains at a binary low value.

As additionally illustrated, for example, at time 246, the LDQS_t 240 causes the generation of CRCWR_L 248 and CRCERR_L 250. As appreciated with respect to CRCERR_L 250, the timing diagram 234 illustrates an example in which an error (e.g., a CRC error) is detected in the lower DQ-byte (e.g., DQ<7:0>). For example, as noted by the rise of CRCERR_L 250 to a binary high value subsequent to time 246, at least one error is detected in the upper DQ-byte. The timing diagram 258 further illustrates the generated toggle signals CRCWR 252 and CRCERR 254 as being generated subsequent to each of the generation of CRCWR_U 242, CRCERR_U 244, CRCWR_L 248, and CRCERR_L 250. Moreover, through use of the sync logic circuit 52 in the manner discussed previously, CRCWR 252 and CRCERR 254 are synchronized, as illustrated at point 256.

Figure 6:
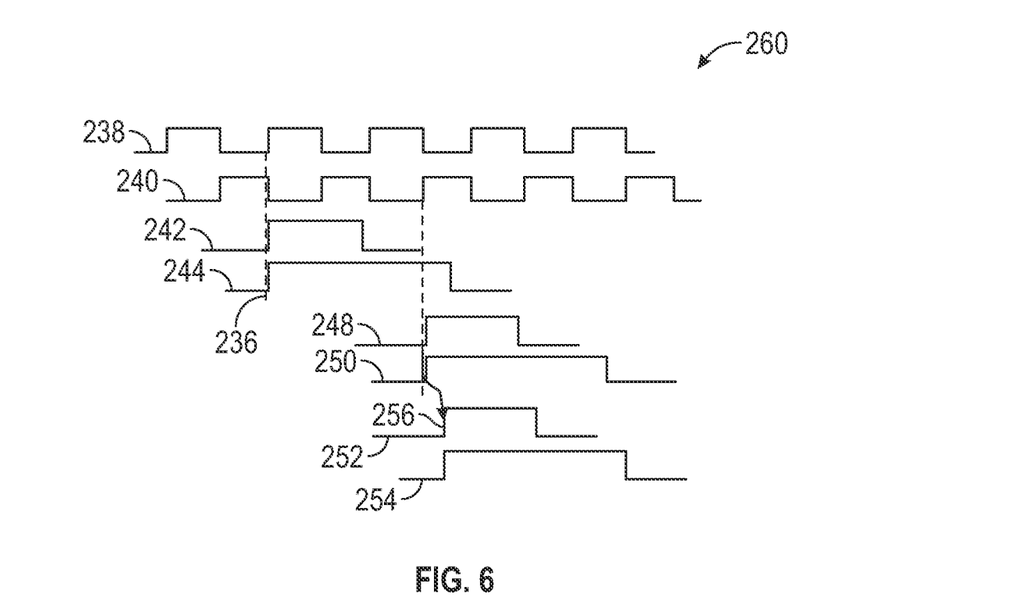
FIG. 6 is a third timing diagram illustrating generation of toggle signals for the CRC write counter and the CRC error counter of the error detection circuitry of FIG. 2, in accordance with an embodiment.

FIG. 6 illustrates a timing diagram 260 illustrating generation of toggle signals (e.g., CRCWR and CRCERR) for the CRC write counter circuit 56 and the CRC error counter circuit respectively. As illustrated, for example, at time 236, the UDQS_t 238 leads the LDQS_t 240 (i.e. CRCWR_U and CRCERR_U will be generated prior to CRCWR_L and CRCERR_L). CRCWR_U 242 and CRCERR_U 244 are additionally illustrated. As appreciated with respect to CRCERR_U 244, the timing diagram 234 illustrates an example in which an error (e.g., a CRC error) is detected in the upper DQ-byte (e.g., DQ<15:8>). For example, as noted by the rise of CRCERR_U 244 to a binary high value subsequent to time 236, at least one error is detected in the upper DQ-byte.

As additionally illustrated, for example, at time 246, the LDQS_t 240 causes the generation of CRCWR_L 248 and CRCERR_L 250. As appreciated with respect to CRCERR_L 250, the timing diagram 234 illustrates an example in which an error (e.g., a CRC error) is also detected in the lower DQ-byte (e.g., DQ<7:0>). For example, as noted by the rise of CRCERR_L 250 to a binary high value subsequent to time 246, at least one error is detected in the upper DQ-byte. The timing diagram 258 further illustrates the generated toggle signals CRCWR 252 and CRCERR 254 as being generated subsequent to each of the generation of CRCWR_U 242, CRCERR_U 244, CRCWR_L 248, and CRCERR_L 250. Moreover, through use of the sync logic circuit 52 in the manner discussed previously, CRCWR 252 and CRCERR 254 are synchronized, as illustrated at point 256. Thus, as illustrated in FIGS. 4-6, use of the sync logic circuit 52 in the manner discussed previously allows for synchronization of CRCWR 252 and CRCERR 254 regardless of whether an error is detected in the lower DQ-byte, in the in the upper DQ-byte, or in each of the lower DQ-byte and the in the upper DQ-byte.

Figure 7:
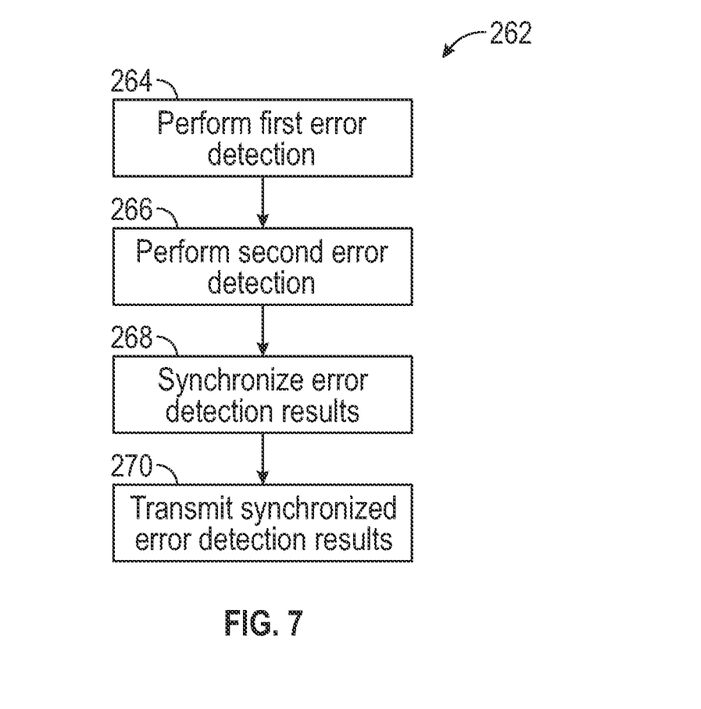
FIG. 7 illustrates a flow diagram of a method to generate toggle signals for the CRC write counter and the CRC error counter of the error detection circuitry of FIG. 2, in accordance with an embodiment.

FIG. 7 illustrates a flow diagram of a method 262 to generate synchronized toggle signals (e.g., CRCWR and CRCERR) for the CRC write counter circuit 56 and the CRC error counter circuit 60 of the error detection circuitry 46. In step 264, a first error detection operation is undertaken. This first error detection operation may be, for example, a CRC error checking (e.g., error detection) operation and may be, for example performed on a portion of data signals 44. For example, the upper byte error detection circuit 48 may receive the upper byte portion of data signals 44 as well as UDQS_t and the upper byte error detection circuit 48 may perform (e.g., via CRC error detection circuitry) detection of errors in the upper byte portion of data signals 44 in conjunction with step 264. Additionally, in conjunction with step 264, the first error detection operation generates and transmits a write signal (e.g., CRCWR_U) that corresponds to, for example, a period of time in which the write of the upper byte of the data signals 44 is being transmitted to the upper byte error detection circuit 48 as well as a CRC error signal (e.g., CRCERR_U) that corresponds to, for example, one or more errors detected in the upper byte portion of data signals 44 by the upper byte error detection circuit 48 (or a lack thereof when no error is detected).

In step 266, a second error detection operation is undertaken. This second error detection operation may be, for example, a CRC error checking (e.g., error detection) operation and may be, for example performed on a (second) portion of data signals 44. For example, the lower byte error detection circuit 50 may receive the lower byte portion of data signals 44 as well as LDQS_t and the lower byte error detection circuit 50 may perform (e.g., via CRC error detection circuitry) detection of errors in the lower byte portion of data signals 44 in conjunction with step 266. Additionally, in conjunction with step 266, the second error detection operation generates and transmits a write signal (e.g., CRCWR_L) that corresponds to, for example, a period of time in which the write of the lower byte of the data signals 44 is being transmitted to the lower byte error detection circuit 50 as well as a CRC error signal (e.g., CRCERR_L) that corresponds to, for example, one or more errors detected in the lower byte portion of data signals 44 by the lower byte error detection circuit 50 (or a lack thereof when no error is detected). It should be noted that the error detection operations in steps 264 and 266 may be performed instead by the lower byte error detection circuit 50 and the upper byte error detection circuit 48.

In step 268, a synchronization operation is undertaken. The synchronization operation in step 268 may be performed by the sync logic circuit 52 and the synchronization operation may synchronize one or more of the write and CRC error signals from step 264 with one or more of the write and CRC error signals from step 266 to generate, for example, a synchronized CRC write signal (e.g., CRCWR) and a synchronized CRC error signal (e.g., CRCERR). In step 270, the synchronized CRC write signal and the synchronized CRC error signal are transmitted as control signals (e.g., toggle signals or clock signals) to control operation of one or more counters utilized in conjunction with the CRC error detection operation and/or the automatic disable functionality of the CRC error detection operation.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A memory device, comprising:
a command interface that when in operation receives a write command;
an input output interface that when in operation receives data signals in conjunction with the write command; and
error detection circuitry coupled to the input output interface and configured to:
generate a first signal indicative of a first period of time during which a first determination is made regarding a first portion of the data signals utilizing a first data strobe signal as a first clock signal;
generate a second signal indicative of a second period of time during which a second determination is made regarding a second portion of the data signals utilizing a second data strobe signal as a second clock signal; and
generate a first control signal based upon the first signal and the second signal by resolving a difference in timing between the first data strobe signal and the second data strobe signal.

2. The memory device of claim 1, wherein the error detection circuitry comprises a first error detection circuit comprising an input that when in operation receives an upper byte of data as the first portion of the data signals.

3. The memory device of claim 2, wherein the first error detection circuit comprises a second input configured to receive the first data strobe signal.

4. The memory device of claim 3, wherein the first error detection circuit comprises cyclic redundancy check (CRC) circuitry configured to detect whether an error is present in the upper byte of data as the first determination.

5. The memory device of claim 3, wherein the first error detection circuit when in operation transmits a first error detection signal and the first signal.

6. The memory device of claim 5, wherein the error detection circuitry comprises a second error detection circuit comprising a third input that when in operation receives a lower byte of data as the second portion of the data signals.

7. The memory device of claim 6, wherein the second error detection circuit comprises a fourth input configured to receive the second data strobe.

8. The memory device of claim 7, wherein the second error detection circuit comprises second cyclic redundancy check (CRC) circuitry configured to detect whether a second error is present in the lower byte of data as the second determination.

9. The memory device of claim 8, wherein the second error detection circuit when in operation transmits a second error detection signal and the second signal.

10. The memory device of claim 9, comprising a sync logic circuit coupled to each of the first error detection circuit and the second error detection circuit, wherein the sync logic circuit when in operation generates a second control signal based upon the first error detection signal and the second error detection signal.

11. The memory device of claim 10, wherein the sync logic circuit when in operation synchronizes the first control signal with the second control signal based upon a slower of the first data strobe signal and the second data strobe signal.

12. The memory device of claim 11, wherein the error detection circuitry comprises a write counter circuit coupled to the sync logic circuit, wherein in operation the write counter circuit comprises a first counter configured to receive the first control signal as a third clock signal.

13. The memory device of claim 12, wherein the error detection circuitry comprises an error counter circuit coupled to the sync logic circuit, wherein when in operation the error counter circuit comprises a second counter configured to receive the second control signal as a fourth clock signal.

14. The memory device of claim 13, wherein the error detection circuitry comprises auto-disable logic utilized in an automatic disable function of an error detection operation and re-enabling write error checking by the error detection circuitry.

15. An error detection circuit, comprising:
  first cyclic redundancy check (CRC) circuitry comprising:
    a first input that when in operation receives a first portion of data signals;
    a second input that when in operation receives a first data strobe signal;
    a first output that when in operation transmits a first signal indicative of a first period of time for a first write operation of the first portion of data signals, wherein the first signal is generated based upon the first data strobe signal; and
    a second output that when in operation transmits a second signal indicative of whether a first error is present in the first portion of data signals;
  second cyclic redundancy check (CRC) circuitry comprising:
    a third input that when in operation receives a second portion of data signals;
    a fourth input that when in operation receives a second data strobe signal;
    a third output that when in operation transmits a third signal indicative of a second period of time for a second write operation of the second portion of data signals, wherein the second signal is generated based upon the second data strobe signal; and
    a fourth output that when in operation transmits a fourth signal indicative of whether a second error is present in the second portion of data signals; and
  a sync logic circuit coupled to the first output, the second output, the third output, and the fourth output, wherein the sync logic circuit comprises:
    a first circuit that when in operation generates a first output signal utilizing the first signal as a first clock signal to control generation of the first output;
    a second circuit that when in operation generates a second output signal utilizing the third signal as a second clock signal to control generation of the second output; and
    a fifth output coupled to each of the first circuit and the second circuit, wherein the fifth output when in operation transmits a first control signal generated based upon the first output signal and the second output signal.

16. The error detection circuit of claim 15, wherein the sync logic circuit, comprises a third circuit that when in operation generates a third output signal based upon the second signal and fourth signal.

17. The error detection circuit of claim 16, wherein the third circuit comprises a clock input that when in operation receives a third clock signal based upon the first signal and the third signal, wherein the third circuit utilizes the third clock signal to initiate transmission of the third output signal.

18. The error detection circuit of claim 16, wherein the sync logic circuit, comprises a sixth output that when in operation transmits a second control signal generated based upon the third output signal.

19. A method, comprising:
  performing error detection on a first portion of data signals utilizing a first data strobe signal during a first period of time;
  performing error detection on a second portion of the data signals utilizing a second data strobe signal during a second period of time;
  receiving a first signal indicative of the first period of time;
  receiving a second signal indicative of the second period of time; and
  generating a control signal based upon the first signal and the second signal by resolving a difference in timing between the first data strobe signal and the second data strobe signal.

20. The method of claim 19, comprising generating a second control signal indicative of whether an error was detected in the first portion of the data signals or the second portion of the data signals.

* * * * *